United States Patent
Zhen et al.

(10) Patent No.: US 12,144,317 B2
(45) Date of Patent: Nov. 19, 2024

(54) COLLAPSIBLE PET TRAVEL CRATE

(71) Applicant: Radio Systems Corporation, Knoxville, TN (US)

(72) Inventors: Pan Zhen, Shenzhen Guangdong (CN); Amanda Sweetnam, Beaverdam, VA (US)

(73) Assignee: Radio Systems Corporation, Knoxville, TN (US)

( * ) Notice: Subject to any disclaimer, the term of this patent is extended or adjusted under 35 U.S.C. 154(b) by 66 days.

(21) Appl. No.: 17/679,697

(22) Filed: Feb. 24, 2022

(65) Prior Publication Data

US 2023/0263128 A1 Aug. 24, 2023

(51) Int. Cl.
*A01K 1/02* (2006.01)
*A01K 1/015* (2006.01)

(52) U.S. Cl.
CPC .......... *A01K 1/0272* (2013.01); *A01K 1/0157* (2013.01)

(58) Field of Classification Search
CPC ............................ A01K 1/0272; A01K 1/0157
USPC ................................. 135/143, 144, 147, 148
See application file for complete search history.

(56) References Cited

U.S. PATENT DOCUMENTS

| | | | | |
|---|---|---|---|---|
| 4,077,418 A * | 3/1978 | Cohen | ..................... | E04H 15/48 |
| | | | | 135/95 |
| 5,005,526 A * | 4/1991 | Parker | .................. | A01K 1/0272 |
| | | | | 119/751 |
| 7,044,083 B2 * | 5/2006 | Farmer | ................ | A01K 1/0254 |
| | | | | 119/474 |
| 7,802,540 B2 * | 9/2010 | Jakubowski | ......... | A01K 1/0254 |
| | | | | 119/497 |
| 2005/0229866 A1 * | 10/2005 | Simpson | ................ | A01K 1/033 |
| | | | | 119/499 |
| 2008/0011234 A1 * | 1/2008 | Wilkes | .................... | B60R 7/043 |
| | | | | 119/28.5 |
| 2014/0102377 A1 * | 4/2014 | Hoffman | .............. | A01K 1/0272 |
| | | | | 119/496 |
| 2021/0007326 A1 * | 1/2021 | Nieto | ....................... | A01K 1/03 |

FOREIGN PATENT DOCUMENTS

KR         20210063555 A  *  6/2021  ........... A01K 1/0272

OTHER PUBLICATIONS

Hwang Young, Pet Stroller for Both Car Seat and Carriage Machine Translation, Jun. 2021 (Year: 2021).*

* cited by examiner

*Primary Examiner* — Joshua J Michener
*Assistant Examiner* — Nicole Paige Maccrate
(74) *Attorney, Agent, or Firm* — Baker, Donelson, Bearman, Caldwell & Berkowitz, PC

(57) ABSTRACT

A collapsible pet travel crate for use with at least one car seat includes an internal frame and a housing. The internal frame has two side members and four foldable members extending between the side members. Each side member has an upright rear portion. Each foldable members a first piece and a second piece coupled to the first piece through a lockable hinge. Each first piece is coupled to one side member through a first pivot hinge. Each second piece is coupled to the other side member through a second pivot hinge. The housing includes two oppositely disposed side panels and a central panel. Each side panel also has an upper mounting slot and a lower mounting slot. The housing includes a front mounting strap. The car seat belt extends through the first and second slots and across the front surface of the rear portions of the two side members.

17 Claims, 5 Drawing Sheets

COLLAPSIBLE PET TRAVEL CRATE

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present inventive concept relates to the field of pet crates. More particularly, the invention relates to a pet travel crate that is collapsible.

Technology in the Field of the Invention

Pet owners oftentimes travel with their pet or carry their pets from one location to another in a car. Allowing the pet to roam around the interior of a car is dangerous to both the pet and the driver. Therefore, for the safety of both the pet and the driver the pet should be placed within an enclosure to limit its movement within the car while traveling.

Some enclosures or pet crates are made of a rigid material such as plastic. These crates have a size that may be inconvenient to store or move. As such, some crates have been designed to be collapsible so as to reduce the volume of the crate when stowed.

Pet travel carriers or crates have been designed for use within a car, as shown in U.S. Pat. Nos. 7,789,044 and 10,772,288. These travel crates are usually made of a flexible material and have windows to allow the pet to see outside the crate while also allowing the pet owner to view the pet within the crate. A problem with such crates is that they are designed to have the seat belt of the car wrap about the front or forward facing surface of the crate, as shown in U.S. Pat. Nos. D649,719 and 10,772,288. Should the car come to an abrupt stop, the entire crate will move forward, causing the rearward end of the crate to move forward and at least to partially crumple against the stationary forward end of the crate being restrained by the seat belt. This crumpling of the crate may cause injury to the pet therein. Furthermore, the pet may slam into the unyielding, forwardly positioned seat belt, again possibly causing harm to the pet within the crate.

A need therefore exists for an improved collapsible travel crate for a pet which provides a safe enclosure for the pet while traveling within a car.

BRIEF SUMMARY OF THE INVENTION

A collapsible pet travel crate configured to be mounted upon a car seat having a flexible seat belt. The collapsible pet travel crate comprises an internal frame having two laterally disposed forward frame portions, two laterally disposed rearward frame portions, two laterally disposed top frame portions extending between the forward frame portions and the rearward frame portions, and two laterally disposed lower frame portions extending between the forward frame portions and the rearward frame portions. The travel crate also has a housing covering the internal frame. The housing has a first seatbelt slot positioned closely adjacent one rearward frame portion. The housing also has a second seatbelt slot positioned closely adjacent the other rearward frame portion. The first seatbelt slot and the second seatbelt slot are positioned to allow a car seat belt to pass through the first seatbelt slot to the second seatbelt slot while also being positioned across a forward facing surfaces of the rearward frame portions.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Figure 1:
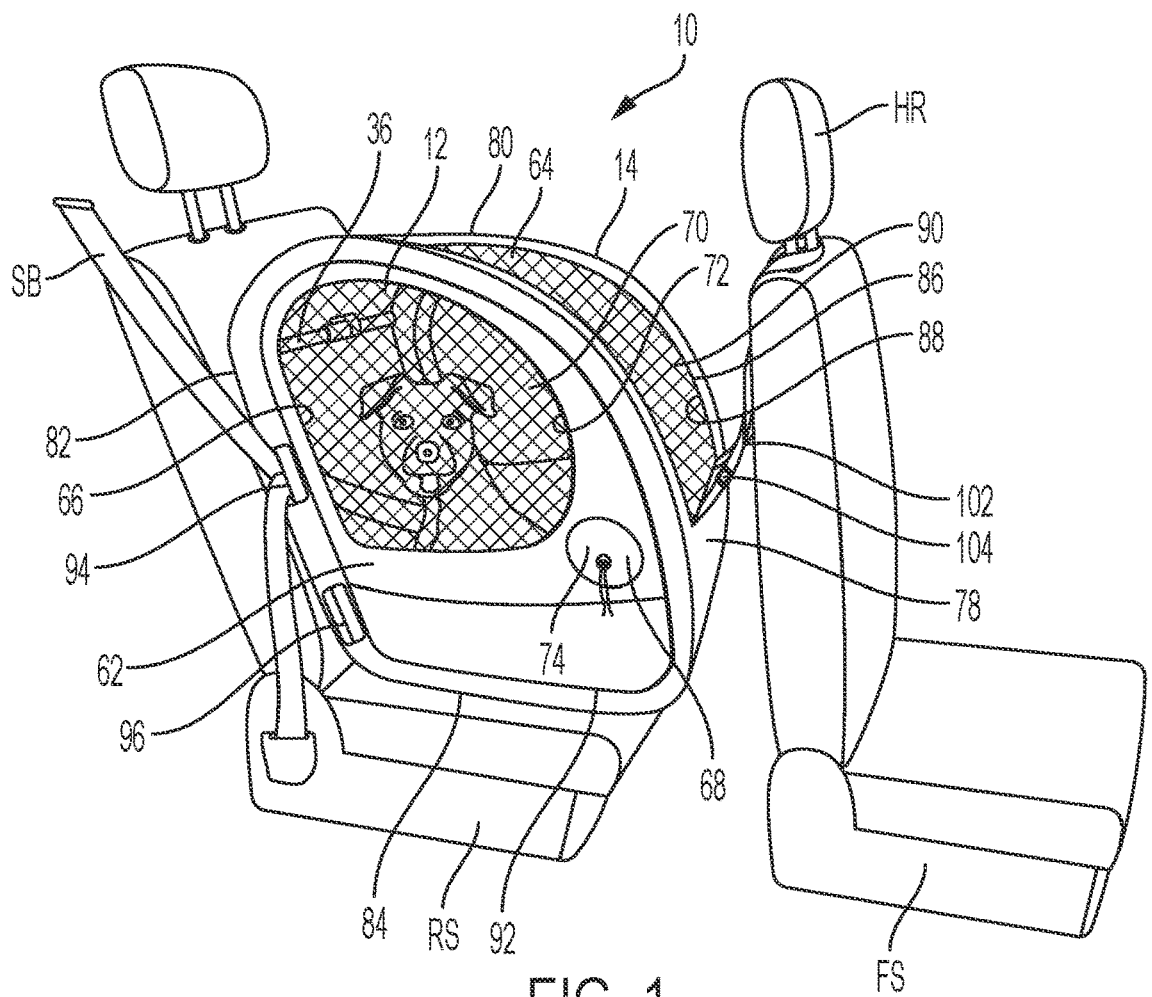
FIG. 1 is a perspective view of a collapsible pet travel crate embodying principles of the invention in a preferred form, shown in an in-use configuration mounted to and between two car seats.
Figure 2:
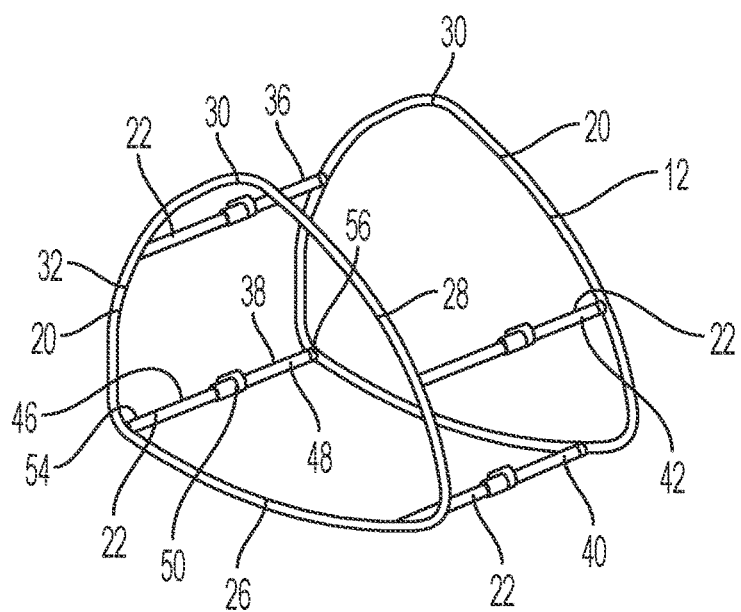
FIG. 2 is a perspective view of the internal frame of the collapsible pet travel crate of FIG. 1.

With reference next to the drawings, there is a shown a collapsible pet travel crate 10 for a pet embodying principles of the invention in a preferred form, referenced hereinafter simply as crate 10. The crate 10 is intended to be used in conjunction with at least one car seat of a car or automobile.

The crate 10 includes an internal frame 12 and a flexible exterior enclosure, cover, or housing 14 coupled to the internal frame 12. The crate 10 defines an interior space 16 in which the pet is placed while traveling.

The internal frame 12 has two laterally and oppositely disposed side members, frame portions, or frames 20 and four foldable members or stanchions 22 extending between the two side members 20. Each side member 20 includes a lower or floor portion 26, a curved or arcuate front portion 28 extending from the floor portion 26, a top portion 30 extending from the front portion 28, and an upright or vertical rear portion 32 extending between the floor portion 26 and the top portion 30. Thus, the two floor portions 26 are laterally disposed from each other, two front portions 28 are laterally disposed from each other, two top portions 30 are laterally disposed from each other, and two rear portions 32 are laterally disposed from each other.

Each of the four foldable members 22 includes an upper, rear member 36 extending between the side members 20 proximal the joinder between the top portion 30 and the rear portion 32, a lower, rear member 38 extending between the side members 20 proximal the joinder between rear portion 32 and the floor portion 26, a lower, front member 40 extending between the side members 20 proximal the joinder between the floor portion 26 and the front portion 28, and an upper, front member 42 extending between the side members 20 generally above the joinder between the floor portion 26 and the front portion 28.

Each of the four foldable members 22 includes a first piece or segment 46 and a second piece or segment 48 coupled to the first piece 46 through a lockable hinge 50. Each lockable hinge 50 is lockable so that the first piece 46 is selectively locked in longitudinally or straight alignment with the second piece 48. Each lockable hinge 50 has a release button 52 which when engaged allows for the pivotal movement of the lockable hinge 50. Each first piece 46 is coupled to one side member 20 through a first pivot or pivot hinge 54 oppositely disposed from the lockable hinge 50. Each second piece 48 is coupled to the other side member 20 through a second pivot or pivot hinge 56 oppositely disposed from the lockable hinge 50.

The housing 14 fits over or covers the interior frame 12. The housing 14 includes two oppositely disposed side panels 62 and a central panel 64 spanning or extending between the two oppositely disposed side panels 62. Each side panel 62 has a side window 66 and a side hand passage or access port 68. Each side window 66 has a netting or otherwise see through material 70 occupying the opening 72 of the side window 66. The netting material 70 may extend over the other portions of the side panels 62 to provide additional strength to the side panels 62. Each side hand passage 68 has an annular, gatherable and closable covering 74 that may be moved or between an open configuration and a closed configuration, so as to selectively allow or preventing the passage of objects through the side hand passage 68.

The housing central panel 64 has a front section 78, a top section 80 extending from the front section 78, a rear section 82 extending from the top section 80, and a floor or bottom section 84 extending between the rear section 82 and the front section 78. The housing central panel 64 also has a front window 86 defined by a central opening 88 extending through the front section 78 and the top section 80 of the housing 12 to a position adjacent the rear section 82 of the housing 12. The front window 86 has a netting or otherwise see through material 90 occupying the central opening 88.

The peripheral edge of the side panels 62 are provided with a zipper 92, or other releasable fastener, which has a cooperating zipper portion extending about the edges of the central panel in the area of the front section 78, top section 80, bottom section 84, and possibly a portion of the rear section 82, so that the side panels 62 act as pivoting or foldable doors. The zipper 92 may be unzipped so that a side panel 62 may be moved to allow access to the interior space 16 of the crate 10.

Each side panel 62 also has a vertically oriented upper mounting slot 94 and a vertically oriented lower mounting slot 96. The upper and lower mounting slots 94 and 96 are positioned closely adjacent the junction of the side panels 62 with the rear section 82 of the housing central panel 64.

The side panels 62 and the central panel 64, other than the netting material 70 and 90 of the windows 66 and 86, may be made of a relatively strong, flexible material such as a woven fabric, canvas, plastic sheeting, or the like.

The housing 14 also includes a removable, rigid, padded floor mat or pad 98 configured to overlay the bottom section 84 of the central panel 64. The forward and rearward ends of the floor mat 98 are held in place through a releasable fastener 100, such as a hook and loop type fastener, coupling the floor mat 98 to the central panel 64, as shown in FIG. 5.

Lastly, the housing 14 includes a front mounting or safety strap 102 coupled at each end to the front section 78 of the central panel 64. The safety strap 102 is adjustable in length through a buckle or coupler 104.

Figure 3:
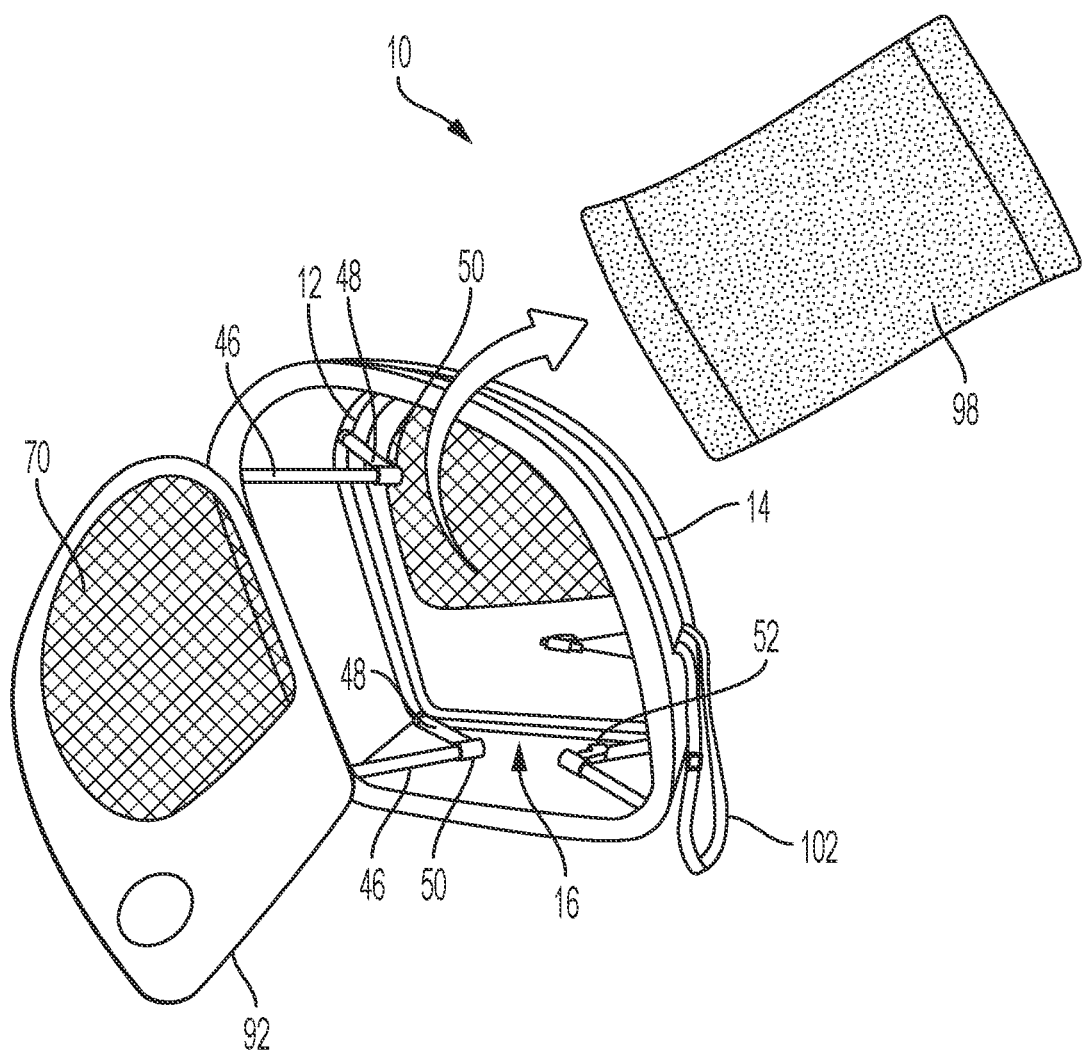
FIGS. 3-6 are a series of perspective views of the collapsible pet travel crate of FIG. 1, showing multiple steps in reconfiguring the collapsible travel crate from a collapsed configuration to an in-use configuration.
Figure 4:
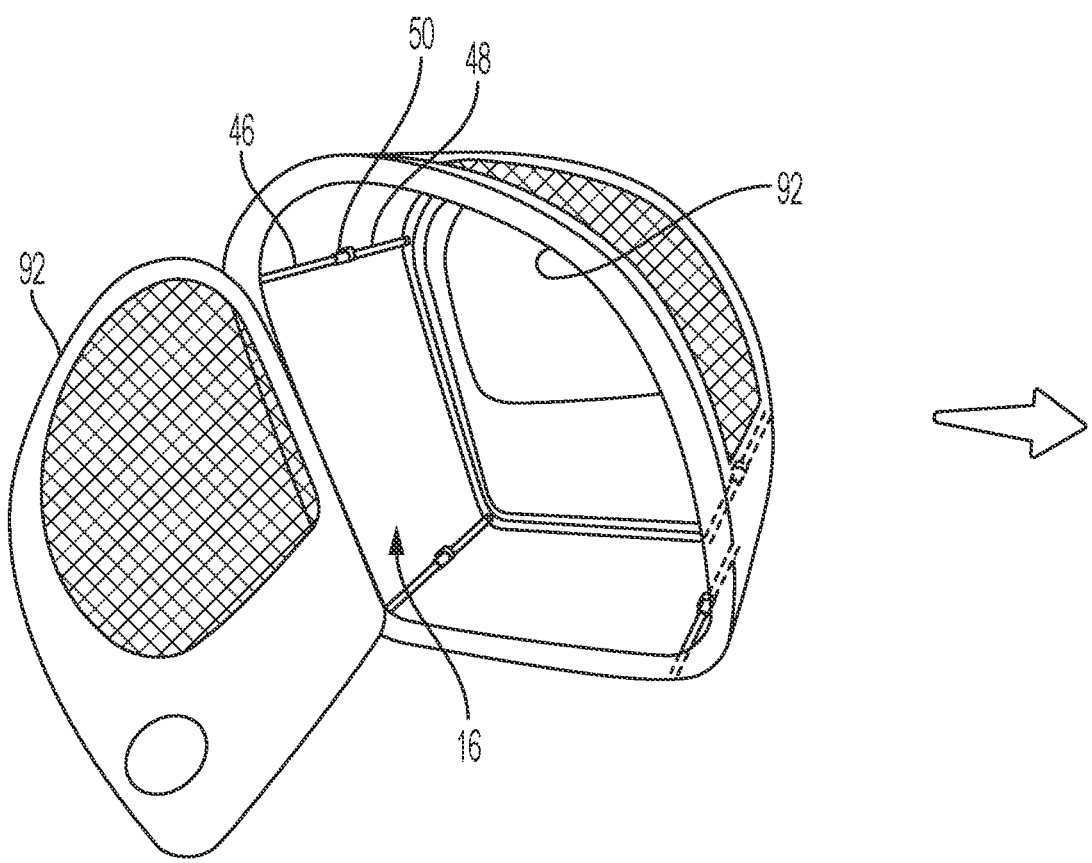

In use, the crate 10 may be moved or reconfigured from a stored, stowed or collapsed configuration wherein the four foldable members 22 are folded or collapsed so that the two side members 20 of the internal frame 12 are proximal each other, as shown generally in partially collapsed configuration in FIG. 3, to an expanded or in-use configuration, as shown generally in FIGS. 1, 2, 4, 5 and 6. With the crate 10 in its collapsed configuration, the central panel 64 is generally folded upon itself, crumple, or collapsed. As best shown in FIGS. 3 and 4, to reconfigure the crate 10 to its in-use configuration, a zipper 92 of a side panel 62 is unzipped and the side panel 62 is folded back so that a person may reach into the interior space 16 of the crate 10 and manipulate the four foldable members 22. The first piece 46 of each of the four foldable members 22 is moved from a folded position into longitudinal alignment with the second piece 48 of each of the foldable members 22 through pivotal movement of the lockable hinges 50 coupling the first pieces 46 to the second pieces 48, the pivotal movement of the first piece 46 about first pivot hinge 54, and the pivotal movement of the second piece 48 about the second pivot hinge 56. The full extension of the lockable hinges 50 automatically locks or engages the lockable hinges 50 to maintain this position. With the four foldable members 22 fully extended, the two side members 20 are separated from or distal each other, thereby stretching the central panel 64 of the housing 14 to its taut, expanded configuration.

Figure 5:
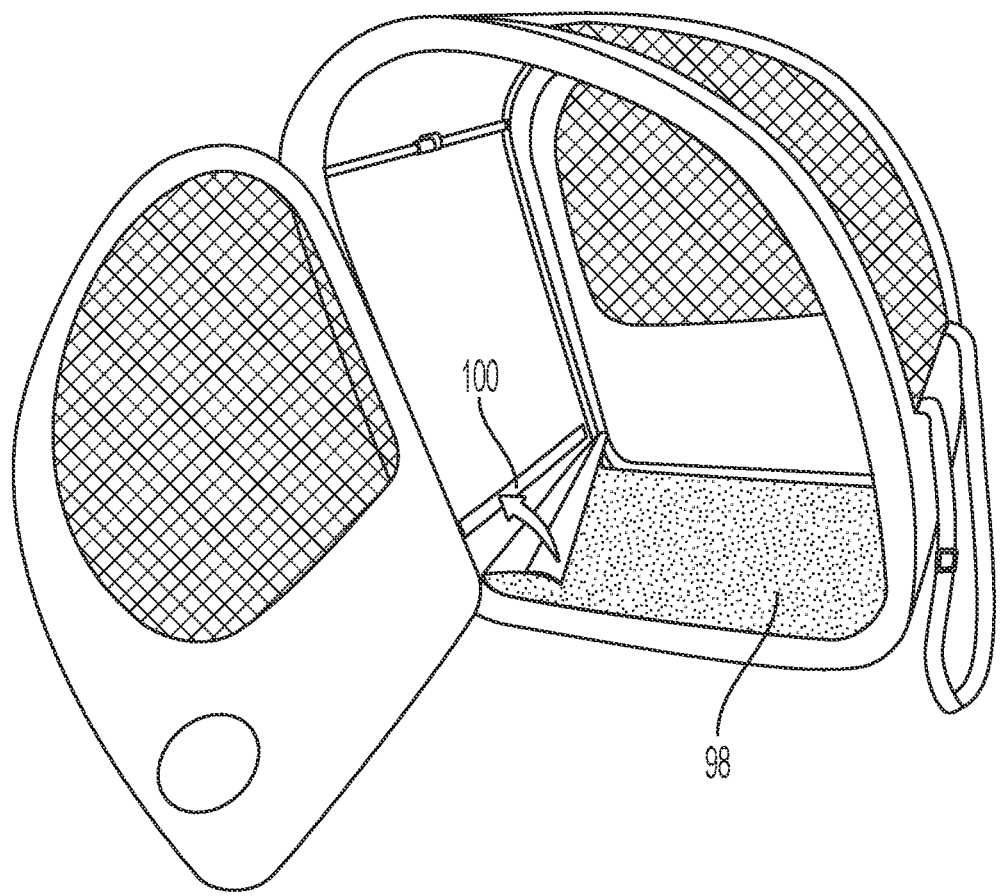

The padded floor mat 98 is then placed over the lower, rear member 38, lower front member 40, and bottom section 84 of the central panel 64, as shown in FIG. 5. The releasable fastener 100 is then coupled together to secure the position of the floor mat 98 relative to the internal frame 12 and remaining housing portions.

Figure 6:
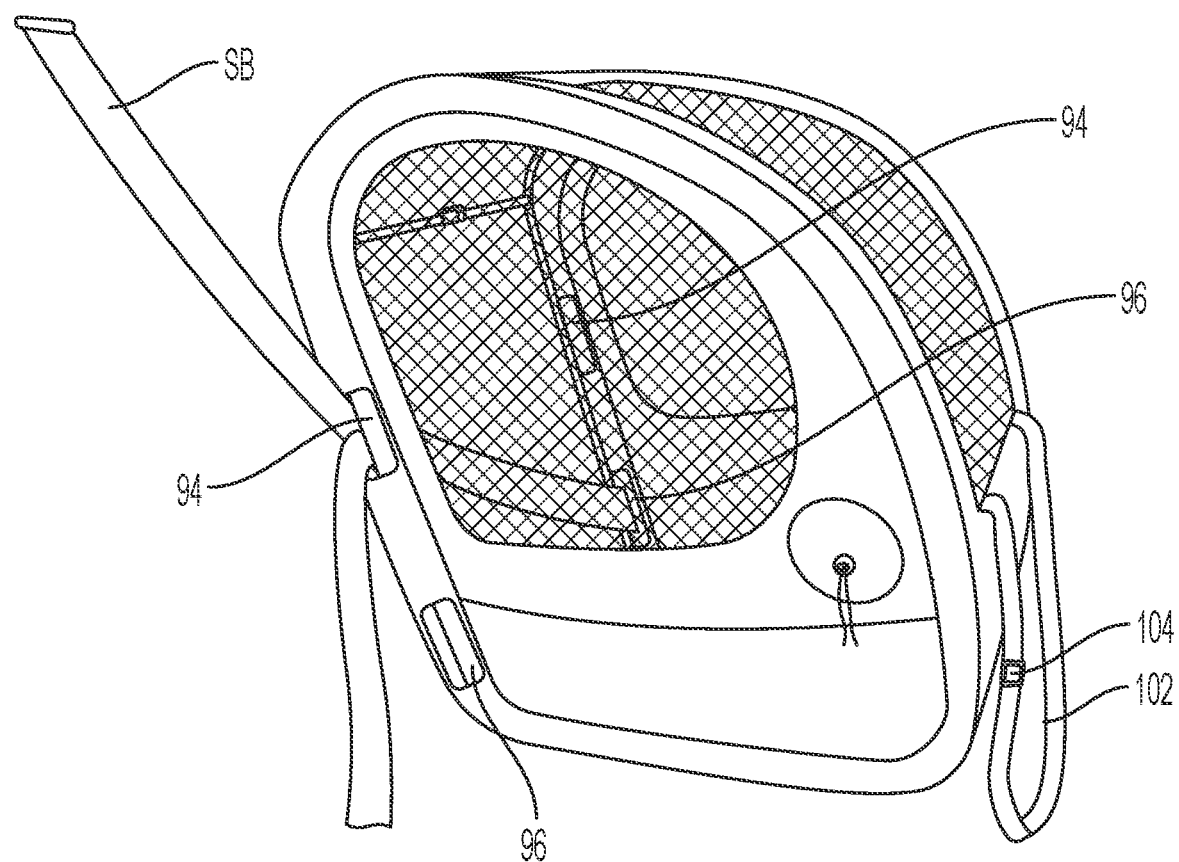

With the crate 10 placed in a proper position within the car and upon the rear seat RS, the car's seat belt SB is passed through the upper slot 94 of the side panel 62, through the interior space 16 of the crate 10, and through the lower slot 96 of the opposite side panel 62, as shown in FIG. 6.

The front safety strap 102 is then looped over the headrest HR of the front seat FS, as shown in FIG. 1. The length of the front safety strap 102 is adjusted through the coupler 104 to be generally taut so as to prevent unwanted sliding or movement of the crate 10 relative to the car seat.

With the crate 10 now properly positioned and secured, the pet owner may pass the pet through the opened side of the crate created by folding the side panel 62 and into the interior space 16 of the crate 10. The open zipper 92 is then zipped up to fully close the side panel 62, and thus the crate 10.

The positioning the seat belt SB across the front or forward facing surfaces of the rear portion 32 of each of the two side members 20 of the internal frame 12 ensures that the internal frame 12, and thus the entire crate 10, remains snuggly or firmly against the vertical or backrest portion of the back seat BS, even if the car comes to an abrupt stop. As the seat belt is positioned against the rear of the crate 10, between the pet and the back seat, rather than being wrapped about the front of the crate, should the car come to an abrupt stop, the pet will not slam into the seat belt. Instead, the pet will contact the flexible and forgiving front section 78 of the central panel 64, thereby greatly reducing the chance of causing injury to the pet.

This positioning also prevents the crate 10 from crumpling in the event the car makes an abrupt stop, as the anchoring of the crate at its rearward end prevents the rearward end from moving forward and crumpling against the front end. This is different from the prior art crates wherein the unrestrained rearward end could move forwardly and crumple toward the front end of the crate.

Lastly, this positioning of the seat belt SB also provides at least three anchor points of the crate 10, these three anchor points being the contact of the seat belt SB at the upper slot 94 and side member rear portion 32, at the lower slot 96 and side member rear portion 32, and at the location between the safety strap 102 and the front seat FS. Although the anchoring between the safety strap 102 and the front seat FS may also be thought of as two anchor points given that the safety strap 102 is attached to the central panel 64 at two separate locations, and thus the crate may be considered to have four separate anchor points.

To reconfigure the crate 10 from its in-use configuration to its collapsed configuration, the previously recited steps are simply reversed. To move the four foldable members 22 from their longitudinally aligned, extended positions to their folded, collapsed positions, the release button 52 of each lockable hinge 50 is depressed to allow the pivotal movement of the lockable hinges 50.

It should be understood that as used herein, the reference to "forward", "front", "rearward" or "rear" is meant to be in reference to the movement or direction of the car moving forward. This distinction is important as it is crucial that the seatbelt SB be coupled to the rear or rearward portion of the crate 10 while the seatbelt SB is also positioned over the forward or front surface of the internal frame 12.

A collapsible pet travel crate is described herein and is under an embodiment configured to be mounted upon a car seat having a flexible seat belt, the collapsible pet travel crate comprising an internal frame having two laterally disposed forward frame portions, two laterally disposed rearward frame portions, two laterally disposed top frame portions extending between the forward frame portions and the rearward frame portions, and two laterally disposed lower frame portions extending between the forward frame portions and the rearward frame portions, and a housing covering the internal frame, the housing having a first seatbelt slot positioned closely adjacent one rearward frame portion, the housing also having a second seatbelt slot positioned closely adjacent the other rearward frame portion, the first seatbelt slot and the second seatbelt slot being positioned to allow a car seat belt to pass through the first seatbelt slot to the second seatbelt slot while also being positioned across a forward facing surfaces of the rearward frame portions.

One rearward frame portion, one top frame portion, and one lower frame portion forms a first side member, wherein the other forward frame portion, the other rearward frame portion, the other top frame portion, and the other lower frame portion forms a second side member, and wherein the internal frame includes a plurality of foldable members extending between the first side member and the second side member, under an embodiment.

Each foldable member includes a first piece and a second piece coupled to the first piece for movement between a folded configuration and a longitudinally aligned, straight configuration, under an embodiment.

The first piece has a first end having a lockable hinge and a second end having a first pivot hinge couple to the first side member, and wherein the second piece has a first end coupled to the lockable hinge and a second end having a second pivot hinge coupled to the second side member, under an embodiment.

The housing has at least one side door releasably coupled to a central panel, under an embodiment.

The collapsible pet travel crate includes a rigid, padded mat positioned to overlay a bottom section of the housing, under an embodiment.

The collapsible pet travel crate of claim includes a mounting strap coupled to a front section of the housing, under an embodiment.

A collapsible pet travel crate is described herein and is under an embodiment configured to be mounted upon a car seat having a flexible seat belt, the collapsible pet travel crate comprising an internal frame having two oppositely disposed side members and a plurality of foldable members extending laterally between the two oppositely disposed side member, each side member having a forward frame portion, a rearward frame portion, a top frame portion extending between the forward frame portion and the rearward frame portion, and a lower frame portion extending between the forward frame portion and the rearward frame portion, each foldable member of the plurality of foldable members having a first piece and a second piece pivotally mounted to the first piece through a lockable hinge for movement between a folded position and an longitudinally aligned extended position, the first piece being coupled to one side member through a first hinge oppositely disposed along the first piece from the lockable hinge, the second piece being coupled to the other side member through a second hinge oppositely disposed along the second piece from the lockable hinge, and a housing covering the internal frame.

The housing has a first seatbelt slot positioned closely adjacent the rearward frame portion of one side member, the housing also having a second seatbelt slot positioned closely adjacent the rearward frame portion of the other side member, the first seatbelt slot and the second seatbelt slot being positioned to allow a car seat belt to pass through the first seatbelt slot to the second seatbelt slot while also being positioned across a forward facing surface of the rearward frame portion of each side member, under an embodiment.

The housing has at least one side door releasably coupled to a central panel, under an embodiment.

The collapsible pet travel crate includes a rigid, padded mat positioned to overlay a bottom section of the housing, under an embodiment.

The collapsible pet travel crate includes a mounting strap coupled to a front section of the housing, under an embodiment.

A collapsible pet travel crate is described herein and is under an embodiment configured to be mounted upon a car seat having a flexible seat belt, the collapsible pet travel crate comprising an internal frame having a first side frame portion and a second side frame portion laterally spaced from the first side frame portion, the first side frame portion having an upright first rear portion positioned at a rearward end of the crate, the second side frame portion having an upright second rear portion positioned at a rearward end of the crate, and a housing covering the internal frame, the housing having a first seatbelt slot positioned closely adjacent the first rear portion of the first side frame portion, the housing also having a second seatbelt slot positioned closely adjacent the second rear portion of the second side frame portion, the first seatbelt slot and the second seatbelt slot being positioned to allow a car seat belt to pass through the first seatbelt slot to the second seatbelt slot while also being positioned across a forward facing surface of the first rear portion and the forward facing surface of the second rear portion.

The internal frame includes a plurality of foldable members extending between the first side frame portion and the second side frame portion, under an embodiment.

Each foldable member of the plurality of foldable members includes a first piece and a second piece coupled to the first piece for movement between a folded configuration and a longitudinally aligned, straight configuration, under an embodiment.

The first piece has a first end having a lockable hinge and a second end having a first pivot hinge couple to the first side frame portion, and wherein the second piece has a first end coupled to the lockable hinge and a second end having a second pivot hinge coupled to the second side frame portion, under an embodiment.

The housing has at least one side door, under an embodiment.

The collapsible pet travel crate includes a rigid, padded mat positioned to overlay a lower portion of the housing, under an embodiment.

The collapsible pet travel crate includes a mounting strap coupled to a front section of the housing, under an embodiment.

It will be appreciated that the embodiments described herein are susceptible to modification, variation and change without departing from the spirit thereof.

The invention claimed is:

1. A collapsible pet travel crate configured to be mounted upon a car seat having a flexible seat belt, the collapsible pet travel crate comprising:
    an internal frame having a first unitary side frame portion and a second unitary side frame portion laterally spaced from the first unitary side frame portion, the first unitary side frame portion having an upright first rear portion positioned at a rearward end of the crate, the second unitary side frame portion having an upright second rear portion positioned at a rearward end of the crate, wherein the internal frame may be collapsed in a lateral direction to move the first unitary side frame portion and the second unitary side frame portion towards and away from each other to laterally collapse the internal frame, and
    a housing covering the internal frame, the housing having a first seatbelt slot positioned adjacent the first rear portion of the first unitary side frame portion, the housing also having a second seatbelt slot positioned adjacent the second rear portion of the second unitary side frame portion, the first seatbelt slot and the second seatbelt slot being positioned to allow a car seat belt to pass through the first seatbelt slot to the second seatbelt slot while also being positioned across an external forwardmost facing surface of the first rear portion and an external forwardmost facing surface of the second rear portion.

2. The collapsible pet travel crate of claim 1 wherein the internal frame includes a plurality of foldable members extending between the first unitary side frame portion and the second unitary side frame portion.

3. The collapsible pet travel crate of claim 2 wherein each foldable member of the plurality of foldable members includes a first piece and a second piece coupled to the first piece for movement between a folded configuration and a longitudinally aligned, straight configuration.

4. The collapsible pet travel crate of claim 1 wherein the first piece has a first end having a lockable hinge and a second end having a first pivot hinge coupled to the first unitary side frame portion, and wherein the second piece has a first end coupled to the lockable hinge and a second end having a second pivot hinge coupled to the second unitary side frame portion.

5. The collapsible pet travel crate of claim 1 wherein the housing has at least one side door.

6. The collapsible pet travel crate of claim 1 further including a rigid, padded mat positioned to overlay a lower portion of the housing.

7. The collapsible pet travel crate of claim 1 further including a mounting strap coupled to a front section of the housing.

8. A collapsible pet travel crate configured to be mounted upon a car seat having a flexible seat belt, the collapsible pet travel crate comprising:
    an internal frame having two laterally disposed forward frame portions, two laterally disposed rearward frame portion, two laterally disposed top frame portions extending between the forward frame portions and the rearward frame portions, and two laterally disposed lower frame portions extending between the forward frame portions and the rearward frame portions, wherein one forward frame portion, one rearward frame portion, one top frame portion, and one lower frame portion forms a first rigid side member, wherein the other forward frame portion, the other rearward frame portion, the other top frame portion, and the other lower frame portion forms a second rigid side member, and wherein the internal frame includes a plurality of foldable members extending between the first rigid side member and the second rigid side member wherein the internal frame may be collapsed in a lateral direction to bring the first rigid side member and the second rigid side member between a first position distal each other and a second position proximal each other, and
    a housing covering the internal frame, the housing having a first seatbelt slot positioned adjacent one rearward frame portion, the housing also having a second seatbelt slot positioned adjacent the other rearward frame portion, the first seatbelt slot and the second seatbelt slot being positioned to allow a car seat belt to pass through the first seatbelt slot to the second seatbelt slot while also being positioned across an external forwardmost facing surfaces of the rearward frame portions.

9. The collapsible pet travel crate of claim 8 wherein each foldable member includes a first piece and a second piece coupled to the first piece for movement between a folded configuration and a longitudinally aligned, straight configuration.

10. The collapsible pet travel crate of claim 9 wherein the first piece has a first end having a lockable hinge and a second end having a first pivot hinge coupled to the first side member, and wherein the second piece has a first end coupled to the lockable hinge and a second end having a second pivot hinge coupled to the second side member.

11. The collapsible pet travel crate of claim 8 wherein the housing has at least one side door releasably coupled to a central panel.

12. The collapsible pet travel crate of claim 8 further including a rigid, padded mat positioned to overlay a bottom section of the housing.

13. The collapsible pet travel crate of claim 8 further including a mounting strap coupled to a front section of the housing.

14. A collapsible pet travel crate configured to be mounted upon a car seat having a flexible seat belt, the collapsible pet travel crate comprising:

an internal frame having two oppositely disposed side members and a plurality of foldable members extending laterally between the two oppositely disposed side members, each side member having a forward frame portion, a rearward frame portion, a top frame portion extending between the forward frame portion and the rearward frame portion, and a lower frame portion extending between the forward frame portion and the rearward frame portion, each foldable member of the plurality of foldable members having a first piece and a second piece pivotally mounted to the first piece through a lockable hinge for movement between a folded position and a longitudinally aligned extended position, the first piece being coupled to one side member through a first hinge oppositely disposed along the first piece from the lockable hinge, the second piece being coupled to the other side member through a second hinge oppositely disposed along the second piece from the lockable hinge, wherein the internal frame may be collapsed in a lateral direction to bring the two oppositely disposed side members together and apart from each other for movement between a laterally collapsed configuration and a laterally expanded configuration, and a housing covering the internal frame, wherein the housing has a first seatbelt slot positioned adjacent the rearward frame portion of one side member, the housing also having a second seatbelt slot positioned adjacent the rearward frame portion of the other side member, the first seatbelt slot and the second seatbelt slot being positioned to allow 3 car seat belt to pass through the first seatbelt slot to the second seatbelt slot while also being positioned across an exterior forward-most facing surface of the rearward frame portion of each side member.

15. The collapsible pet travel crate of claim 14 wherein the housing has at least one side door releasably coupled to a central panel.

16. The collapsible pet travel crate of claim 14 further including a rigid, padded mat positioned to overlay a bottom section of the housing.

17. The collapsible pet travel crate of claim 14 further including a mounting strap coupled to a front section of the housing.

* * * * *